(12) United States Patent
Uesugi et al.

(10) Patent No.: US 9,677,220 B2
(45) Date of Patent: Jun. 13, 2017

(54) FLUOROPOLYMERS AND TREATMENT AGENT

(75) Inventors: Norimasa Uesugi, Settsu (JP); Kouji Kubota, Settsu (JP); Ikuo Yamamoto, Settsu (JP); Peter Cheshire Hupfield, Dyfed (GB)

(73) Assignee: DAIKIN INDUSTRIES, LTD., Osaka-shi, Osaka (JP)

( * ) Notice: Subject to any disclaimer, the term of this patent is extended or adjusted under 35 U.S.C. 154(b) by 317 days.

(21) Appl. No.: 13/510,787

(22) PCT Filed: Nov. 18, 2010

(86) PCT No.: PCT/JP2010/071068
§ 371 (c)(1),
(2), (4) Date: Aug. 2, 2012

(87) PCT Pub. No.: WO2011/062292
PCT Pub. Date: May 26, 2011

(65) Prior Publication Data
US 2012/0295503 A1 Nov. 22, 2012

Related U.S. Application Data

(60) Provisional application No. 61/263,050, filed on Nov. 20, 2009.

(51) Int. Cl.
| | |
|---|---|
| C08G 77/442 | (2006.01) |
| C08F 220/24 | (2006.01) |
| D06M 15/657 | (2006.01) |
| C08K 5/16 | (2006.01) |
| C09K 3/18 | (2006.01) |
| D06M 15/277 | (2006.01) |
| D06M 15/576 | (2006.01) |
| C09K 3/10 | (2006.01) |

(52) U.S. Cl.
CPC ......... *D06M 15/657* (2013.01); *C08F 220/24* (2013.01); *C08G 77/442* (2013.01); *C08K 5/16* (2013.01); *C09K 3/18* (2013.01); *D06M 15/277* (2013.01); *D06M 15/576* (2013.01); *C09K 2003/1081* (2013.01); *Y10T 442/2172* (2015.04)

(58) Field of Classification Search
None
See application file for complete search history.

(56) References Cited

U.S. PATENT DOCUMENTS

| | | | | |
|---|---|---|---|---|
| 5,021,501 | A * | 6/1991 | Ohmori et al. | 524/544 |
| 5,068,295 | A * | 11/1991 | Misaizu | D06M 15/277 526/245 |
| 5,247,008 | A | 9/1993 | Michels et al. | |
| 5,536,304 | A * | 7/1996 | Coppens | C08K 5/5435 106/287.13 |
| 5,883,185 | A | 3/1999 | Matsumura et al. | |
| 6,376,592 | B1 * | 4/2002 | Shimada et al. | 524/457 |
| 6,472,019 | B1 | 10/2002 | Yamaguchi et al. | |
| 6,582,620 | B2 | 6/2003 | Miyadai et al. | |
| 6,933,338 | B2 | 8/2005 | Sugimoto et al. | |
| 7,097,785 | B2 * | 8/2006 | Vazquez | A61K 31/53 252/8.61 |
| 7,485,688 | B2 | 2/2009 | Maekawa et al. | |
| 7,615,592 | B2 * | 11/2009 | Sagawa | C08F 6/003 524/507 |
| 2002/0055602 | A1 * | 5/2002 | Gerle et al. | 528/45 |
| 2004/0087695 | A1 * | 5/2004 | Sugimoto | C08F 220/24 524/386 |
| 2007/0015867 | A1 | 1/2007 | Maekawa et al. | |
| 2007/0190874 | A1 * | 8/2007 | Vazquez | C08G 77/442 442/81 |

FOREIGN PATENT DOCUMENTS

| | | | |
|---|---|---|---|
| EP | 2147961 A1 | | 1/2010 |
| EP | 2208770 A1 | | 7/2010 |
| JP | 6390588 A | * | 10/1986 |
| JP | 2000-256302 A | | 9/2000 |
| WO | WO 2004/069935 A1 | | 8/2004 |
| WO | WO 2004/069955 A1 | | 8/2004 |
| WO | WO 2006/121171 | * | 11/2006 |
| WO | WO 2008/143299 A1 | | 11/2008 |
| WO | WO 2009/054176 A1 | | 4/2009 |
| WO | WO 2009/084705 A1 | | 7/2009 |
| WO | WO 2009/122919 A2 | * | 10/2009 |
| WO | WO 2010/030041 A1 | | 3/2010 |
| WO | WO 2011/062294 A1 | | 5/2011 |

OTHER PUBLICATIONS

English language abstract for WO 2004069935 extracted from the espacenet.com database on Jun. 28, 2012, 30 pages.
English language abstract for WO 2004069955 extracted from the espacenet.com database on Jun. 28, 2012, 28 pages.
English language abstract for WO 2008143299 extracted from the espacenet.com database on Jun. 28, 2012, 38 pages.
English language abstract for WO 2009054176 extracted from the espacenet.com database on Jun. 28, 2012, 25 pages.
English language abstract and translation for JP 2000-256302 extracted from the PAJ database on Jun. 28, 2012, 88 pages.
International Search Report for Application No. PCT/JP2010/071068 dated Feb. 10, 2011, 4 pages.
International Search Report for Application No. PCT/JP2010/071072 dated Feb. 10, 2011, 4 pages.

\* cited by examiner

*Primary Examiner* — Marc Zimmer
(74) *Attorney, Agent, or Firm* — Howard & Howard Attorneys PLLC

(57) ABSTRACT

Disclosed is a fluorine-containing polymer prepared by polymerizing (I) a polyfluoroalkyl group-containing (meth)acrylate which is substituted at alpha-position, in the presence of (II) a blocked isocyanate compound. A water- and oil-repellent composition containing the fluorine-containing polymer can impart the excellent water- and oil-repellency, and excellent durability thereof to substrates.

17 Claims, No Drawings

FLUOROPOLYMERS AND TREATMENT AGENT

CROSS-REFERENCE TO RELATED APPLICATIONS

This application claims priority to and all the advantages of International Patent Application No. PCT/JP2010/071068, filed Nov. 18, 2010, which claims priority to U.S. Provisional Patent Application No. 61/263,050, filed on Nov. 20, 2009, both of which are incorporated herein by reference in their entirety.

TECHNICAL FIELD

This invention relates to a water- and oil-repellent copolymer and composition which can give excellent water- and oil-repellency and excellent durability of water- and oil-repellency.

BACKGROUND ARTS

Fluorocarbon polymers are extensively used in the textile industry to impart oleophobicity/oil repellency to a fabric. For example, U.S. Pat. No. 5,247,008 describes finishing agents for textiles, leather, paper and mineral substrates which are aqueous dispersions of a copolymer of a perfluoroalkyl acrylate or methacrylate, an alkyl acrylate or methacrylate and an aminoalkyl acrylate or methacrylate.

U.S. Pat. No. 5,068,295 describes a water and oil repellent comprising a copolymer of a perfluoroalkyl acrylate or methacrylate, a polyorganosiloxane containing a vinyl group and a vinyl monomer containing an isocyanate or blocked isocyanate group.

U.S. Pat. Nos. 6,582,620 and 5,883,185 describe a treating composition for textiles to render them water and oil repellent obtained by cohydrolysis and condensation of (A) a fluorinated alkyl-bearing alkoxysilane, (B) an amino-bearing alkoxysilane, and (C) an alkoxysilyl-bearing polyorganosiloxane.

U.S. Pat. No. 5,536,304 describes application of a blend of a succinic anhydride-terminated polydimethylsiloxane and a poly(fluoroalkyl methacrylate) to cotton to give a fabric with oil repellency.

U.S. Pat. No. 6,472,019 describes treating a textile with a water- and oil-repellent agent comprising a fluorine-containing polymer and a sulphated fatty acid compound and WO 2004/069935 and WO 2004/069955 describe a fluorine containing polymer delivered as an aqueous dispersion for textile treatment.

U.S. Pat. No. 6,376,592 discloses a water dispersion type water and oil repellent composition which provides soft handling during treatment and which is capable of imparting practical water and oil repellency excellent in durability against washing, dry cleaning and abrasion.

One of the major disadvantages of the above-mentioned water and oil repellent agents is that the water and oil repellent agent cannot impart very high water- and oil-repellency having excellent durability.

PROBLEMS TO BE SOLVED BY THE INVENTION

An object of the present invention is to provide a water- and oil-repellent agent comprising a fluorine-containing polymer which imparts excellent water- and oil-repellency and excellent durability of water- and oil-repellency.

SUMMARY OF THE INVENTION

The present inventors discovered that the above-mentioned object can be achieved by a water- and oil-repellent composition comprising a fluorine-containing polymer comprising:
(I) a polyfluoroalkyl group-containing (meth)acrylate which is substituted at alpha-position,
wherein the water- and oil-repellent composition comprises:
(II) an isocyanate compound blocked with at least one blocking agent.

The water- and oil-repellent composition may comprise: a fluorine-containing polymer chemically bonded to the blocked isocyanate compound; a cluster of the fluorine-containing polymer and the blocked isocyanate compound; and/or a mixture of the fluorine-containing polymer and the blocked isocyanate compound.

The present invention provides a fluorine-containing polymer prepared by polymerizing:
(I) a polyfluoroalkyl group-containing (meth)acrylate which is substituted at alpha-position,
in the presence of:
(II) a blocked isocyanate compound.

The present invention provides an aqueous dispersion water- and oil-repellent composition comprising said fluorine-containing polymer.

The aqueous dispersion water- and oil-repellent composition of the present invention is useful to provide water and oil repellency to a variety of surfaces. When treating textiles, the fluorosilicone polymer of the present invention may also provide a softer hand or feel than conventional fluorocarbon based water and oil repellent treatments.

EFFECTS OF THE INVENTION

According to the present invention, when a substrate is treated, the water- and oil-repellent composition can impart the excellent water- and oil-repellency, and durability thereof. When the substrate is a textile, the treated textile has relatively good feeling.

MODE FOR CARRYING OUT THE INVENTION

The water- and oil-repellent polymer of the present invention comprises (I) the fluorine-containing polymer, preferably a fluorine- and silicon-containing polymer and (II) the blocked isocyanate.

In the present invention, the monomer (A) forming the fluorine-containing polymer comprises:
(a) a fluorine-containing monomer,
(b) optionally present, a fluorine-free monomer other than a crosslinkable monomer, and
(c) optionally present, a crosslinkable monomer.

The fluorine-containing polymer may be a homopolymer formed from one monomer or a copolymer formed from at least two monomers.

The homopolymer has the repeating units derived from the fluorine-containing monomer (a). The copolymer may has the repeating units derived from at least two fluorine-containing monomers (a), or may have, in addition to the repeating units derived from the fluorine-containing monomer (a), the repeating units derived from the fluorine-free monomer (b) and optionally the crosslinkable monomer (c).

The fluorine-containing polymer can be prepared by polymerizing the monomer (A) in the presence of the functional organopolysiloxane (C).

The fluorine-containing polymer constituting the surface treatment agent of the present invention comprises:
(a) the fluorine-containing monomer, and
optionally (b) the fluorine-free monomer other than the crosslinkable monomer, and
optionally (c) the crosslinkable monomer.
(A) Monomer
(a) Fluorine-containing Monomer The fluorine-containing monomer (a) comprises the polyfluoroalkyl group-containing (meth)acrylate which is substituted at alpha-position, preferably with monovalent organic group other than a methyl group, or a halogen atom.

The fluorine-containing monomer may be (i) the polyfluoroalkyl group-containing (meth)acrylate which is substituted at alpha-position (which is referred to as "substituted polyfluoroalkyl group-containing acrylate"), or (ii) a combination of the substituted polyfluoroalkyl group-containing acrylate and an unsubstituted polyfluoroalkyl group-containing (meth)acrylate. The "unsubstituted polyfluoroalkyl group-containing (meth)acrylate" means (meth)acrylate which has hydrogen or a methyl group at alpha-position. A weight ratio of the substituted polyfluoroalkyl group-containing acrylate to the unsubstituted polyfluoroalkyl group-containing (meth)acrylate in the fluorine-containing monomer may be 100:0 to 10:90, particularly 99:1 to 30:70.

The substituted polyfluoroalkyl group-containing acrylate may be a fluorine-containing monomer of the formula:

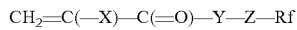

$CH_2=C(-X)-C(=O)-Y-Z-Rf$ wherein X is a monovalent organic group other than a methyl group, or a halogen atom,
Y is —O— or —NH—,
Z is a direct bond or a divalent organic group, and
Rf is a fluoroalkyl group having 1 to 20 carbon atoms. The unsubstituted polyfluoroalkyl group-containing (meth)acrylate may be of the same formula except that X is a hydrogen atom or a methyl group.

In the substituted polyfluoroalkyl group-containing acrylate, X may be a linear or branched alkyl group having 2 to 21 carbon atoms, a fluorine atom, a chlorine atom, a bromine atom, a iodine atom, a $CFX^1X^2$ group (wherein $X^1$ and $X^2$ is a hydrogen atom a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group.

Z may be for example a linear or branched alkylene group having 1 to 20 carbon atoms, for example a group of the formula $—(CH_2)_x—$ where x is 1 to 10, a group of the formula $—SO_2N(R^1)R^2—$ or of the formula $—CON(R^1)R^2—$, where $R^1$ is an alkyl group having 1 to 10 carbon atoms and $R^2$ is a linear or branched alkylene group having 1 to 10 carbon atoms, or a group of the formula $—CH_2CH(OR^3)CH_2—$ where $R^3$ represents a hydrogen atom or an acyl group having 1 to 10 carbon atoms such as formyl or acetyl, or a group of the formula $—Ar—CH_2—$ where Ar is an arylene group optionally having a substituent, or a $—(CH_2)_m—SO_2—(CH_2)_n—$ group, or a $—(CH_2)_m—S—(CH_2)_n$-group (wherein m is from 1 to 10 and n is from 0 to 10.).

In the substituted polyfluoroalkyl group-containing acrylate, the fluorine-containing monomer (a) is preferably an acrylate ester of the formula:

$CH_2=C(-X)-C(=O)-Y-Z-Rf$ (I)

wherein X is a linear or branched alkyl group having 2 to 21 carbon atoms, a fluorine atom, a chlorine atom, a bromine atom, a iodine atom, a $CFX^1X^2$ group (wherein $X^1$ and $X^2$ is a hydrogen atom a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group;
Y is —O—;
Z is a direct bond, an aliphatic group having 1 to 10 carbon atoms, an aromatic or cycloaliphatic group having 6 to 18 carbon atoms, a $—CH_2CH_2N(R^1)SO_2—$ group (wherein $R^1$ is an alkyl group having 1 to 4 carbon atoms), a $—CH_2CH(OZ^1)CH_2—$ group (wherein $Z^1$ is a hydrogen atom or an acetyl group.), a $—(CH_2)_m—SO_2—(CH_2)_n—$ group, or a $—(CH_2)_m—S—(CH_2)_n$-group (wherein m is from 1 to 10 and n is from 0 to 10.); and
Rf is a linear or branched fluoroalkyl group having 1 to 20 carbon atoms. The unsubstituted polyfluoroalkyl group-containing (meth)acrylate is preferably of the same formula (I) except that X is a hydrogen atom or a methyl group.

In the formula (I), the Rf group is preferably a perfluoroalkyl group. The carbon number of the Rf group is from 1 to 20, for example, from 3 to 12. The carbon number of the Rf group may be from 1 to 6. Examples of the Rf group include $—CF_3$, $—CF_2CF_3$, $—CF_2CF_2CF_3$, $—CF(CF_3)_2$, $—CF_2CF_2CF_2CF_3$, $—CF_2CF(CF_3)_2$, $—C(CF_3)_3$, $—(CF_2)_4CF_3$, $—(CF_2)_2CF(CF_3)_2$, $—CF_2C(CF_3)_3$, $—CF(CF_3)CF_2CF_2CF_3$, $—(CF_2)_5CF_3$, $—(CF_2)_3CF(CF_3)_2$, and $C_8F_{17}$.

Z is preferably an aliphatic group having 1 to 10 carbon atoms, an aromatic group or cycloaliphatic group having 6 to 18 carbon atoms, a $—CH_2CH_2N(R^1)SO_2—$ group ($R^1$ is an alkyl group having 1 to 4 carbon atoms.), a $—CH_2CH(OY^1)CH_2—$ group ($Y^1$ is a hydrogen atom or an acetyl group.), a $—(CH_2)_m—SO_2—(CH_2)_n$-group, or a $—(CH_2)_m—S—(CH_2)_n$-group (wherein m is from 1 to 10 and n is from 0 to 10.). The aliphatic group is preferably an alkylene group (particularly the carbon number is from 1 to 4, for example, 1 or 2.). The aromatic group and cycloaliphatic group may be substituted or unsubstituted. The S or $SO_2—$ group may be directly bonded to the Rf group.

The non-limiting examples of the fluorine-containing monomer (a) including the substituted polyfluoroalkyl group-containing acrylate and the unsubstituted polyfluoroalkyl group-containing acrylate are as follows:

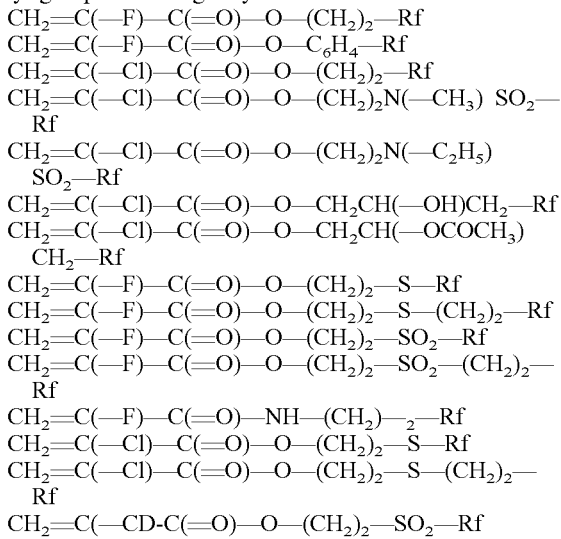

$CH_2=C(-F)-C(=O)-O-(CH_2)_2-Rf$
$CH_2=C(-F)-C(=O)-O-C_6H_4-Rf$
$CH_2=C(-Cl)-C(=O)-O-(CH_2)_2-Rf$
$CH_2=C(-Cl)-C(=O)-O-(CH_2)_2N(-CH_3)SO_2-Rf$
$CH_2=C(-Cl)-C(=O)-O-(CH_2)_2N(-C_2H_5)SO_2-Rf$
$CH_2=C(-Cl)-C(=O)-O-CH_2CH(-OH)CH_2-Rf$
$CH_2=C(-Cl)-C(=O)-O-CH_2CH(-OCOCH_3)CH_2-Rf$
$CH_2=C(-F)-C(=O)-O-(CH_2)_2-S-Rf$
$CH_2=C(-F)-C(=O)-O-(CH_2)_2-S-(CH_2)_2-Rf$
$CH_2=C(-F)-C(=O)-O-(CH_2)_2-SO_2-Rf$
$CH_2=C(-F)-C(=O)-O-(CH_2)_2-SO_2-(CH_2)_2-Rf$
$CH_2=C(-F)-C(=O)-NH-(CH_2)-_2-Rf$
$CH_2=C(-Cl)-C(=O)-O-(CH_2)_2-S-Rf$
$CH_2=C(-Cl)-C(=O)-O-(CH_2)_2-S-(CH_2)_2-Rf$
$CH_2=C(-CD-C(=O)-O-(CH_2)_2-SO_2-Rf$

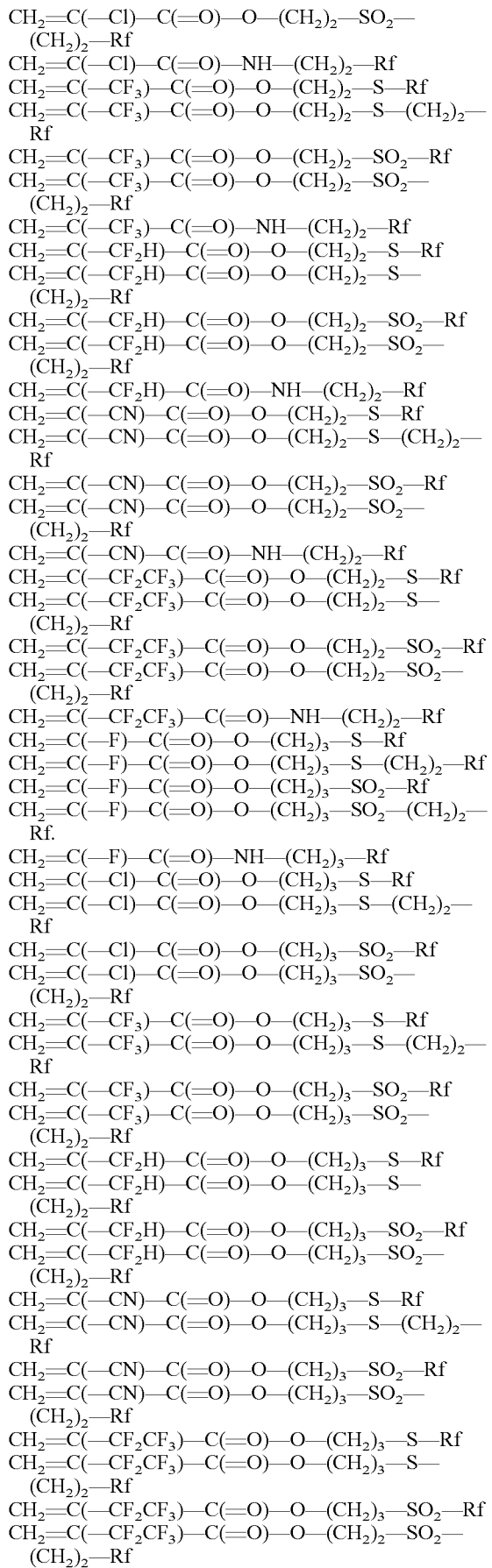

wherein Rf is a linear or branched fluoroalkyl group having 1 to 20 carbon atoms.

(b) Fluorine-free Monomer

The fluorine-containing polymer may have the repeating units derived from the fluorine-free monomer (b). The fluorine-free monomer (b) is other than the crosslinkable monomer (c). The monomer (b) is preferably a fluorine-free monomer having a carbon-carbon double bond. The monomer (b) is preferably a vinyl monomer which is free from fluorine. The fluorine-free monomer (b) is generally a compound having one carbon-carbon double bond. Preferable examples of the fluorine-free monomer (b) include, for example, ethylene, vinyl acetate, vinyl halide such as vinyl chloride, vinylidene halide such as vinylidene chloride, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, and vinyl alkyl ether. The fluorine-free monomer (b) is not limited to these examples. The fluorine-free monomer (b) may contain vinyl halide and/or vinylidene halide.

The fluorine-free monomer (b) may be a (meth)acrylate ester having an alkyl group. The number of carbon atoms of the alkyl group may be from 1 to 30, for example, from 6 to 30, e.g., from 10 to 30. For example, the fluorine-free monomer (b) may be acrylates of the general formula:

$$CH_2=CA^1COOA^2$$

wherein $A^1$ is a hydrogen atom, a methyl group, or a halogen atom (for example, a chlorine atom, a bromine atom and a iodine atom) other than a fluorine atom, and $A^2$ is an alkyl group represented by $C_nH_{2n+1}$ (n=1 to 30).

(c) Crosslinkable Monomer

The fluorine-containing polymer may contain the repeating units derived from the crosslinkable monomer (c). The crosslinkable monomer (c) may be a fluorine-free vinyl monomer having at least two reactive groups and/or carbon-carbon double bonds. The crosslinkable monomer (c) may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group, a carboxyl group, and an active methylene group.

Examples of the crosslinkable monomer (c) include diacetoneacrylamide, (meth)acrylamide, N-methylolacrylamide, hydroxymethyl(meth)acrylate, hydroxyethyl(meth)acrylate, 3-chloro-2-hydroxypropyl(meth)acrylate, N,N-dimethylaminoethyl(meth)acrylate, N,N-diethylaminoethyl(meth)acrylate, butadiene, isoprene, chloroprene, glycerol (meth)acrylate and glycidyl(meth)acrylate, to which the crosslinkable monomer is not limited.

The copolymerization with the monomer (b) and/or the monomer (c) can optionally improve various properties such as water repellency and soil resistance; cleaning durability and washing durability of said repellency and resistance; solubility in solvent; hardness; and feeling.

In the fluorine-containing polymer,
the amount of the fluorine-free monomer (b) may be from 0.1 to 100 parts by weight, for example, from 0.1 to 50 parts by weight, and
the amount of the crosslinkable monomer (c) may be at most 50 parts by weight, for example, at most 20 parts by weight, particularly, from 0.1 to 15 parts by weight, based on 100 parts by weight of the fluorine-containing monomer (a).

The monomer (A) can be polymerized in the presence of the blocked isocyanate and optionally the organopolysiloxane (C). Examples of an olefinically unsaturated co-monomer included in the monomer (A) include alkyl acrylate or methacrylate esters having 1 to 30 carbon atoms in the alkyl group such as butyl acrylate, ethyl acrylate, methyl acrylate, methyl methacrylate or butyl methacrylate. The alkyl acrylate or methacrylate can be used to adjust the glass transition temperature (Tg) of the resulting polymeric product resulting from the reaction of the monomer (A), the blocked isocyanate and optionally the organopolysiloxane (C); for example an acrylate having a long chain alkyl group of 4-20, particularly 8-20 carbon atoms such as stearyl acrylate or methacrylate, octyl acrylate, 2-ethylhexyl acrylate or dodecyl acrylate or methacrylate can be used to form a softer polymer of lower Tg. Copolymers with an alkyl acrylate or methacrylate monomer may improve various properties such as water- and oil-repellency and soil releasability, cleaning durability, washing durability and abrasion resistance of such repellency and releasability, solubility in solvent, hardness and feel (hand). Other acrylate or methacrylate comonomers which can be used include polyethylene glycol acrylate or methacrylate, polypropylene glycol acrylate or methacrylate, methoxypolyethylene glycol acrylate or methacrylate and methoxypolypropylene glycol acrylate or methacrylate. Other olefinically unsaturated comonomers which can be used include vinyl chloride, vinylidene chloride, styrene, acrylonitrile, methacrylonitrile, ethylene, a vinyl alkyl ether, isoprene or a vinyl ester such as vinyl acetate or vinyl propionate. The olefinically unsaturated comonomer can be used which contains a functional group that, although not reactive with amine groups, may be reactive with other functional groups to give properties such as increased substantivity on textiles and other substrates. Examples of such functional groups are hydroxyl, amino and amide, and examples of olefinically unsaturated comonomers containing them are acrylamide, methacrylamide, N-methylolacrylamide, hydroxyethyl methacrylate, hydroxyethyl acrylate, 3-chloro-2-hydroxypropyl acrylate or methacrylate, N,N-dimethylaminoethyl acrylate or methacrylate and diethylaminoethyl acrylate or methacrylate.

(B) Blocked Isocyanate Compound

The blocked isocyanate (B) is an isocyanate blocked with at least one blocking agent.

The blocked isocyanate is a compound having a blocked isocyanate group and no polymerizable unsaturated group, which is one having an isocyanate group moiety of an isocyanate blocked with a blocking agent. The blocked isocyanate compound (B) may be modified with a compound having a hydrophilic group.

Examples of the hydrophilic group include a nonionic hydrophilic group such as a hydroxyl group, an amino group and a polyoxyalkylene group (particularly a polyoxyethylene group); and an ionic (cationic or anionic) hydrophilic group such as a carboxyl group, a sulfate group, sulfonic group, sulfonate group and sulfite group.

The isocyanate may, for example, be tolylene diisocyanate (TDI), diphenylmethane diisocyanate (MDI), MDI oligomer, naphthalene-1,5-diisocyanate, xylylene diisocyanate, hexamethylene diisocyanate (HDI), 4,4-dicyclohexylmethane diisocyanate, norbornane diisocyanate, isophorone diisocyanate (IPDI), an adduct such as a TMP (tri-methylol propane) adduct of TDI or HDI, an allophanate modified product, a biuret modified product (such as a biuret prepared from HDI), an isocyanurate modified product (such as an isocyanurate prepared from TDI, an isocyanurate prepared from HDI, an isocyanurate prepared from IPDI, and an isocyanurate prepared from TDI and HDI) or a carbodiimide modified product of the foregoing compounds, or a urethane prepolymer.

Examples of the blocking agent include (i) oximes, (ii) phenols, (iii) alcohols, (iv) mercaptans, (v) amides, (vi) imides, (vii) imidazoles, (viii) ureas, (ix) amines, (x) imines, (xi) pyrazoles, and (xii) active methylene compounds. Other examples of the blocking agent include pyridinols, thiophenols, diketones, and esters. The blocked isocyanate compound (B) may be modified with compound(s) having a hydrophilic group.

(i) Oximes

Examples of the oximes include formamide oxime, acetaldoxime, acetoxime, methylethyl ketoxime and cyclohexanone oxime.

(ii) Phenols

Examples of the phenols include phenol optionally having at least one (preferably one or two) $C_{1-10}$ alkyl group. Specific examples of the phenols include phenol; a monoalkyl phenol such as cresol, ethylphenol, propylphenol, butylphenol, hexylphenol, 2-ethylhexylphenol and octylphenol; and a dialkyl phenol such as diethylphenol, dipropylphenol, dipropylcresol, dibutylphenol, di-2-ethylhexyl phenol dioctylphenol and dinonylphenol.

Specific examples of phenols include styrenated phenol, hydroxybenzoate ester.

(iii) Alcohols

Examples of the alcohols include an (preferably monohydric) alcohol having $C_1$-$C_{30}$ alkyl group (particularly an alkanol). Specific examples of the alcohol include methanol, ethanol, propanol, 1-butanol, sec-butanol, 2-ethyl-1-hexanol, 2-methoxyethanol, 2-butoxyethanol, 2-methoxy-1-propanol and 3-methyl-2-penten-4-yn-1-ol.

(iv) Mercaptans

Specific examples of the mercaptan include butyl mercaptan and dodecyl mercaptan.

(v) Amides

Specific examples of the amides (preferably acid amides) include acetanilide, acetic acid amide, beta-propiolactam, gamma-butyrolactam, delta-valerolactam, epsilon-caprolactam, laurolactam, stearolactam, N-methyl-epsilon-caprolactam and pyrrolidinone.

(vi) Imides

Specific examples of the imides include acid imide such as succinic imide and maleic imide.

(vii) Imidazoles

Specific examples of the imidazole include midazole and 2-methylimidazole.

(viii) Ureas

Specific examples of the ureas include urea, thiourea and ethylene urea.

(ix) Amines

Specific examples of the amines include diphenylamine, aniline, carbazole, diethylamine, dipropylamine and propylethylamine.

(x) Imines

Specific examples of the imines include ethylene imine and polyethylene imine.

(xi) Pyrazoles

Specific examples of the pyrazole compound include: 2-methyl-pyrazole, 3-methyl-pyrazole, 4-methyl-pyrazole, 2,4-dimethyl-pyrazole, 2,5-dimethyl-pyrazole, 3,4-dimethyl-pyrazole, 3,5-dimethyl-pyrazole, 4-nitro-3,5-dimethyl-pyrazole, 4-bromo-3,5-dimethyl-pyrazole.

(xii) Active Methylene Compounds

Examples of the active methylene compounds include malonate ester such as $C_{1-30}$-alkyl malonate, acetoacetate ester such as $C_{1-30}$-alkyl acetoacetate, and acetylacetone.

The blocking agent for forming the blocked isocyanate compound is preferably a pyrazole compound or a malonate ester compound.

The pyrazole compound may be of the formula:

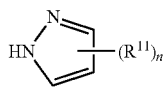

wherein each of $R^{11}$ is, the same or different, an alkyl group, an alkenyl group, an aralkyl group, N-substituted carbamyl group, a phenyl group, $NO_2$, a halogen atom or a —C(=O)$OR^{12}$ group wherein $R^{12}$ is an alkyl group having 1 to 4 carbon atoms, and n is 0, 1, 2 or 3.

Specific examples of the pyrazole compound include: 2-methyl-pyrazole, 3-methyl-pyrazole, 4-methyl-pyrazole, 2,4-dimethyl-pyrazole, 2,5-dimethyl-pyrazole, 3,4-dimethyl-pyrazole, 3,5-dimethyl-pyrazole, 4-nitro-3,5-dimethyl-pyrazole, 4-bromo-3,5-dimethyl-pyrazole.

The malonate ester compound is a reaction product (monoester or diester, preferably diester) between malonic acid and an alcohol such as a monohydric alcohol. The alcohol generally has a hydrocarbon group having 1 to 30 carbon atoms which bonded to a hydroxyl group. The hydrocarbon group is preferably an alkyl group, particularly having 1 to 4 carbon atoms.

Specific examples of the malonate ester include dimethyl malonate, diethyl malonate, dipropyl malonate, dibutyl malonate, methyl malonate, ethyl malonate, propyl malonate and butyl malonate. The diester is preferable. Preferable specific examples of the malonate ester include dimethyl malonate, diethyl malonate, dipropyl malonate and dibutyl malonate.

The blocked isocyanate compound (B) may be modified with the compound having a hydrophilic group. The compound having a hydrophilic group may be a compound having a nonionic hydrophilic group or a compound having an ionic hydrophilic group. Alternatively, the compound having a hydrophilic group may be resulting from the reaction between a compound having a nonionic hydrophilic group or a compound having an ionic hydrophilic group and an isocyanate, usually, a reaction between active hydrogen (such as —OH or —$NH_2$) and an isocyanato group (—NCO). Each of the compound having a nonionic hydrophilic group and the compound having an ionic hydrophilic group preferably has a number-average molecular weight of 100 to 4000, particularly 200 to 2000. The compound having a nonionic hydrophilic group is particularly preferable. The compound having a nonionic hydrophilic group is preferably a compound having an active hydrogen atom at one end and polyethylene oxide chain. The compound having a nonionic hydrophilic group can be prepared by addition-reacting an alkylene oxide, particularly ethylene oxide to a monoalcohol (for example, having 1 to 30 carbon atoms) such as methanol, wherein the content of ethylene oxide is preferably at least 50% by weight, based on the alkylene oxide (upper limit of the content of ethylene oxide is 100% by weight, for example, 90% by weight, based on the alkylene oxide). The compound having a nonionic hydrophilic group may contain propylene oxide unit in the amount of 0 to 50% by weight, for example, 0 to 20% by weight, particularly 1 to 10% by weight, based on the alkylene oxide. The compound having an ionic hydrophilic group is preferably an anionic compound such as a hydroxycarboxylic acid, an amino acid, an aminosulfonic acid and hydroxysulfonic acid. A cationic compound such as a tertiary amino compound having a hydroxy group such as dimethylamino propanol can be used as the compound having an ionic hydrophilic group. The tertiary amino compound having a hydroxy group is reacted with the isocyanate and then neutralized with an acid or reacted with a quaternizing agent such as benzyl chloride to give a quaternized salt.

Examples of the compound having a hydrophilic group include a mono- to tetra-hydric alcohol having a (for example, C1-C30) aliphatic group, and a (for example, C3-C200) monohydric alcohol having at least one oxyalkylene group, prepared by adding an (for example C2-C5) alkylene oxide to a (for example, C1-C30) monohydric alcohol. Specific examples of the compound having a hydrophilic group include a compound of the formula:

wherein R is $C_1$-$C_{10}$ aliphatic (or alkyl) group such as $CH_3$, $C_2H_5$, $C_3H_7$, $C_4H_9$, and n is 2 to 50, preferably 5-25.

The blocked isocyanate compound can be prepared by reacting the isocyanate [which may be represented by $A(NCO)_m$ wherein A and m are the same as below (for example, A is a group remaining after isocyanate groups are removed, and m is an integer of 2 to 8)] with the blocking agent [which may be represented by RH wherein R may be a hydrocarbon group which may be substituted with a hetero atom such as a nitrogen atom and an oxygen atom, and H is a hydrogen atom].

The blocked isocyanate compound may be a compound of the formula:

wherein A is a m-valent aliphatic group, alicyclic group, heterocyclic group or aromatic group where m is an integer of 2 to 8, Y is, the same or different,

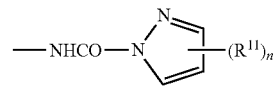

in which each of $R^{11}$ is, the same or different, an alkyl group, an alkenyl group, an aralkyl group, N-substituted carbamyl group, a phenyl group, $NO_2$, a halogen atom or a —C(=O)$OR^{12}$ group wherein $R^{12}$ is an alkyl group having 1 to 4 carbon atoms, and n is 0, 1, 2 or 3;

$R^{21}$ is a hydrocarbon group having 1 to 30 carbon atoms, or a monovalent moiety containing the hydrophilic group, and m is 1 to 10, particularly 2 to 5; or

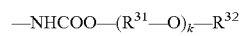

$R^{31}$ is an alkylene group having 2 to 5 carbon atoms, $R^{32}$ is a C1-C10 aliphatic (or alkyl) group such as $CH_3$, $C_2H_5$, $C_3C_7$ and $C_4H_9$, k is 2 to 50, preferably 5-25.

The Y group in the isocyanate compound (H) is preferably (i)
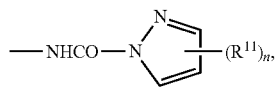

(ii) —NH—C(=O)—CH—(C(=O)—OR$^{21}$)$_2$,
(iii) —NHCOO—(R$^{31}$—O)$_k$—R$^{32}$, or
(iv) a combination of at least two among (i), (ii) and (iii).

The amount of the blocked isocyanate compound may be 0.5 to 50 parts by weight, for example, 1 to 20 parts by weight, based on 100 parts by weight of the all monomers or the fluorine-containing polymer.

The polymer or composition of the present invention can be produced by (i) a method of dispersing the polymerizable monomer and the blocked isocyanate in an aqueous medium to polymerize the polymerizable monomer, or by (ii) a method of adding the blocked isocyanate after the polymerizable monomer is polymerized. The method (i) can provide the composition which comprises a cluster formed by the fluorine-containing polymer and the blocked isocyanate (and dispersed in a liquid medium such as an aqueous medium) or the composition which comprises the fluorine-containing polymer chemically bonded to the blocked isocyanate compound. The method (ii) can provide the composition which comprises a mixture of the fluorine-containing polymer and the blocked isocyanate or the composition which comprises the fluorine-containing polymer chemically bonded to the blocked isocyanate compound. Particularly when the mixture of the fluorine-containing polymer and the blocked isocyanate is contained in the composition, the blocked isocyanate is preferably has at least one a hydrophilic group, for example, by modifying (by a reaction between an —NCO group and an active hydrogen atom) the blocked isocyanate with the above-mentioned compound having the hydrophilic group such as a compound having an active hydrogen atom at one end and polyethylene oxide chain. Thus, the blocked isocyanate may have at least one (for example, 1 to 3) blocking group (derived from the blocking agent) and at least one (for example, 1 or 2) hydrophilic group.

It is preferred to polymerize the polymerizable monomer in the presence of the blocked isocyanate in an amount of 1 to 100 parts by weight based on 100 parts by weight of the polymerizable monomer. In the composition of the present invention, the blocked isocyanate may be bonded or may not be bonded to the polymerizable monomer or the fluorine-containing polymer.

(C) Functional Organopolysiloxane

The functional organopolysiloxane (C) is preferably used in the preparation of the fluorine-containing polymer. Preferably, the monomer (A) is polymerized in the presence of the functional organopolysiloxane (C).

The functional organopolysiloxane is a mercapto-functional organopolysiloxane, a vinyl-functional organopolysiloxane, a (meth)acrylamide-functional organopolysiloxane, a (meth)acrylate-functional siloxane or a mixture thereof. The functional organopolysiloxane (C) functions as a chain transfer agent. By a polymerization reaction, the functional organopolysiloxane (C) bonds to the fluorine-containing polymer through the functional organic group.

The functional organopolysiloxane may be a mercapto-functional organopolysiloxane, that is, an organopolysiloxane having a mercapto-functional organic group present in the molecule. As used herein, a "mercapto-functional organic group" is any organic group containing a sulfur atom, such as —(CH$_2$)$_n$—SH (n is the number of 0 to 10, particularly 1 to 5). The mercapto group-containing silicone (C) (that is, the mercapto-functional organopolysiloxane (C)) is a siloxane compound which has at least one (for example, 1 to 500, particularly 1 to 50, especially 2 to 40) mercapto group and a silicone moiety having two or more siloxane linkages.

The functional organopolysiloxane may be a vinyl-functional organopolysiloxane, that is, an organopolysiloxane having a vinyl-functional organic group present in the molecule. As used herein, a "vinyl-functional organic group" is a group containing a —CH=CH$_2$ group, such as —(CH$_2$)$_n$—CH=CH$_2$ (n is the number of 0 to 10, particularly 1 to 5). The vinyl group-containing silicone (C) (that is, the vinyl-functional organopolysiloxane (C)) is a siloxane compound which has at least one (for example, 1 to 500, particularly 1 to 50, especially 2 to 40) vinyl group and a silicone moiety having two or more siloxane linkages.

The functional organopolysiloxane may be a (meth)acrylamide-functional organopolysiloxane, that is, an organopolysiloxane having a (meth)acrylamide-functional organic group present in the molecule. The term "(meth)acrylamide" means acrylamide or methacrylamide. As used herein, a "(meth)acrylamide-functional organic group" is a group containing a —NH—C(=O)—CQ=CH$_2$ group, such as —(CH$_2$)$_n$—NH—C(=O)—CQ=CH$_2$ (wherein Q is a hydrogen atom or a methyl group, and n is the number of 0 to 10, particularly 1 to 5). The (meth)acrylamide group-containing silicone (C) (that is, the (meth)acrylamide-functional organopolysiloxane (C)) is a siloxane compound which has at least one (for example, 1 to 500, particularly 1 to 50, especially 2 to 40) (meth)acrylamide group and a silicone moiety having two or more siloxane linkages.

The functional organopolysiloxane may be a (meth)acrylate-functional organopolysiloxane, that is, an organopolysiloxane having a (meth)acrylate-functional organic group present in the molecule. The term "(meth)acrylate" means acrylate or methacrylate. As used herein, a "(meth)acrylate-functional organic group" is a group containing a -Q-O—C(=O)CX=CH$_2$ where Q is a divalent organic group, for example, a C$_{1-20}$ hydrocarbon group such as a C$_{1-10}$ alkylene group, and X is Me or H. The (meth)acrylate group-containing silicone (C) (that is, the (meth)acrylate-functional organopolysiloxane (C)) is a siloxane compound which has at least one (for example, 1 to 500, particularly 1 to 50, especially 2 to 40) (meth)acrylate group and a silicone moiety having two or more siloxane linkages.

Organopolysiloxanes are well known in the art and are often designated by the general formula RnSiO$_{(4-n)/2}$, where the organopolysiloxanes may comprise any number of "M" (mono functional) siloxy units (R$_3$SiO$_{0.5}$), "D" (difunctional) siloxy units (R$_2$SiO), "T" (trifunctional) siloxy units (RSiO$_{1.5}$), or "Q" siloxy units (SiO$_2$) where R is independently a monovalent organic group. These siloxy units can be combined in various manners to form cyclic, linear, or branched structures. The chemical and physical properties of the resulting polymeric structures can vary. For example organopolysiloxanes can be volatile or low viscosity fluids, high viscosity fluids/gums, elastomers or rubbers, and resins. R is independently a monovalent organic group, alternatively R is a hydrocarbon group containing 1 to 30 carbons, alternatively R is an alkyl group containing 1 to 30 carbon atoms, or alternatively R is methyl.

The organopolysiloxanes useful as the functional organopolysiloxane are characterized by having at least one of the R groups in the formula $RnSiO_{(4-n)/2}$ be a mercapto, vinyl or (meth)acrylamide group, or alternatively at least one of the R groups be a mercapto, vinyl or (meth)acrylamide group and one of the R groups be an organofunctional group, or alternatively one of the R groups be an organofunctional group also containing a mercapto, vinyl, (meth)acrylamide or (meth)acrylate group. The organofunctional group and mercapto, vinyl, (meth)acrylamide or (meth)acrylate functional group may be present on any siloxy unit having an R substituent, that is, they may be present on any M, D, or T unit. Typically, the organofunctional groups and mercapto, vinyl, (meth)acrylamide or (meth)acrylate groups are present as a R substituent on a D siloxy unit.

As used herein, "organofunctional group" means an organic group containing any number of carbon atoms, but the group contains at least one atom other than carbon and hydrogen. Representative examples of such organofunctional groups include, amines, amides, sulfonamides, quaternaries, ethers, epoxy, phenols, esters, carboxyls, ketones, halogen substituted alkyls and aryls group, to name a few. Alternatively, the organofunctional group is an amino-functional organic group.

When the organofunctional group is an amino-functional organic group, the amino-functional organic group is designated in the formulae herein as $R^N$ and is illustrated by groups having the formula: $—R^1NHR^2$, $—R^1NR^2_2$, or $—R^1NHR^1NHR^2$, wherein each $R^1$ is independently a divalent hydrocarbon group having at least 2 carbon atoms, and $R^2$ is hydrogen or an alkyl group which may have 1 to 10 carbon atoms. Each $R^1$ is typically an alkylene group having from 2 to 20 carbon atoms. $R^1$ is illustrated by groups such as; —CH$_2$CH$_2$—, —CH$_2$CH$_2$CH$_2$—, —CH$_2$CHCH$_3$—, —CH$_2$CH$_2$CH$_2$CH$_2$—, —CH$_2$CH(CH$_3$)CH$_2$—, —CH$_2$CH$_2$CH$_2$CH$_2$CH$_2$—, —CH$_2$CH$_2$CH$_2$CH$_2$CH$_2$CH$_2$—, —CH$_2$CH$_2$CH(CH$_2$CH$_3$)CH$_2$CH$_2$CH$_2$—, —CH$_2$CH$_2$CH$_2$CH$_2$CH$_2$CH$_2$CH$_2$CH$_2$—, and —CH$_2$CH$_2$CH$_2$CH$_2$CH$_2$CH$_2$CH$_2$CH$_2$CH$_2$CH$_2$—. The alkyl groups $R^2$ are as illustrated above for R. When $R^2$ is an alkyl group, it is typically methyl.

Some examples of suitable amino-functional hydrocarbon groups are; —CH$_2$CH$_2$NH$_2$, —CH$_2$CH$_2$CH$_2$NH$_2$, —CH$_2$CHCH$_3$NH, —CH$_2$CH$_2$CH$_2$CH$_2$NH$_2$, —CH$_2$CH$_2$CH$_2$CH$_2$CH$_2$NH$_2$, —CH$_2$CH$_2$CH$_2$CH$_2$CH$_2$CH$_2$NH$_2$, —CH$_2$CH$_2$NHCH$_3$, —CH$_2$CH$_2$CH$_2$NHCH$_3$, —CH$_2$(CH$_3$)CHCH$_2$NHCH$_3$, —CH$_2$CH$_2$CH$_2$CH$_2$NHCH$_3$, —CH$_2$CH$_2$NHCH$_2$CH$_2$NH$_2$, —CH$_2$CH$_2$CH$_2$N, —CH$_2$CH$_2$CH$_2$CH$_2$, —CH$_2$CH$_2$CH$_2$CH$_2$NHCH$_2$CH$_2$CH$_2$NH$_2$, —CH$_2$CH$_2$NHCH$_2$CH$_2$NHCH$_3$, —CH$_2$CH$_2$CH$_2$NHCH$_2$CH$_2$CH$_2$NHCH$_3$, —CH$_2$CH$_2$CH$_2$CH$_2$NHCH$_2$CH$_2$CH$_2$CH$_2$NHCH$_3$, and —CH$_2$CH$_2$NHCH$_2$CH$_2$NHCH$_2$CH$_2$CH$_3$. Typically, the amino-functional group is —CH$_2$CH$_2$CH$_2$NH$_2$.

The mercapto-functional organic group is designated in the formulae herein as $R^S$ and is illustrated by groups having the formula: $—R^1SR^2$, wherein each $R^1$ and $R^2$ is as defined above. The mercapto-functional group is illustrated by the following formulae; —CH$_2$CH$_2$CH$_2$SH, —CH$_2$CHCH$_3$SH, —CH$_2$CH$_2$CH$_2$CH$_2$SH, —CH$_2$CH$_2$CH$_2$CH$_2$CH$_2$SH, —CH$_2$CH$_2$CH$_2$CH$_2$CH$_2$CH$_2$SH, —CH$_2$CH$_2$SCH$_3$. Typically, the mercapto-functional group is —CH$_2$CH$_2$CH$_2$SH.

The vinyl-functional organic group is designated in the formulae herein as $R^V$. The vinyl-functional organic group is illustrated by the following formulae; —CH=CH$_2$, —CH$_2$CH$_2$CH$_2$—CH=CH$_2$, —CH$_2$CHCH$_3$—CH=CH$_2$, —CH$_2$CH$_2$CH$_2$CH$_2$—CH=CH$_2$, —CH$_2$CH$_2$CH$_2$CH$_2$CH$_2$—CH=CH$_2$, —CH$_2$CH$_2$CH$_2$CH$_2$CH$_2$CH$_2$—CH=CH$_2$. Typically, the vinyl-functional group is —CH=CH$_2$.

The (meth)acrylamide-functional organic group is designated in the formulae herein as $R^{AM}$ and is illustrated by groups having the formula: $—R^1—NH—C(=O)—CQ=CH_2$ group (wherein $R^1$ is a divalent hydrocarbon group having at least 2 carbon atoms, and Q is a hydrogen atom or a methyl group). The (meth)acrylamide-functional group is illustrated by the following formulae; —CH$_2$CH$_2$CH$_2$—NH—C(=O)—CH=CH$_2$, —CH$_2$CH$_2$CH$_2$—NH—C(=O)—C(CH$_3$)=CH$_2$, —CH$_2$CHCH$_3$—NH—C(=O)—CH=CH$_2$, —CH$_2$CHCH$_3$—NH—C(=O)—C(CH$_3$)=CH$_2$, —CH$_2$CH$_2$CH$_2$CH$_2$—NH—C(=O)—C(CH$_3$)=CH$_2$, —CH$_2$CH$_2$CH$_2$CH$_2$—NH—C(=O)—C(CH$_3$)=CH$_2$. Typically, the (meth)acrylamide-functional group is —CH$_2$CH$_2$CH$_2$—NH—C(=O)—C(CH$_3$)=CH$_2$.

The (meth)acrylate-functional organic group is designated in the formulae herein as $R^{MA}$ and is illustrated by groups having the formula: $—R^1—O—C(=O)—CQ=CH_2$ group (wherein $R^1$ is a divalent hydrocarbon group having at least 2 carbon atoms, and Q is a hydrogen atom or a methyl group). The (meth)acrylate-functional group is illustrated by the following formulae; —CH$_2$CH$_2$CH$_2$—O—C(=O)—CH=CH$_2$, —CH$_2$CH$_2$CH$_2$—O—C(=O)—C(CH$_3$)=CH$_2$, —CH$_2$CHCH$_3$—O—C(=O)—CH=CH$_2$, —CH$_2$CHCH$_3$—O—C(=O)—C(CH$_3$)=CH$_2$, —CH$_2$CH$_2$CH$_2$CH$_2$—O—C(=O)—C(CH$_3$)=CH$_2$, —CH$_2$CH$_2$CH$_2$CH$_2$—O—C(=O)—C(CH$_3$)=CH$_2$. Typically, the (meth)acrylate-functional group is —CH$_2$CH$_2$CH$_2$—O—C(=O)—C(CH$_3$)=CH$_2$.

In a preferable embodiment, the functional organopolysiloxane (designated C') comprises siloxy units having the average formula:

$(R^2SiO)_a(RR^NSiO)_b(RR^{FO}SiO)_c$ where; a is 0-4000, alternatively 1 to 1000, alternatively 2 to 400, b is 0-1000, alternatively 1 to 100, alternatively 2 to 50, c is 1-1000, alternatively 2 to 100, alternatively 3 to 50;

R is independently a monovalent organic group, alternatively R is a hydrocarbon containing 1-30 carbon atoms, alternatively R is a monovalent alkyl group containing 1-12 carbons, or alternatively R is a methyl group;

$R^N$ is a monovalent amino-functional organic group as defined above, $R^{FO}$ each is a monovalent mercapto-functional organic group ($R^S$), a monovalent vinyl-functional organic group ($R^V$), a monovalent (meth)acrylamide-functional organic group ($R^{AM}$) or a monovalent (meth)acrylate-functional organic group ($R^{MA}$), as defined above.

The $R^N$ group may be $R^F$ wherein $R^F$ may be a monovalent organofunctional organic group as defined above, such as hydroxyls, amines, amides, sulfonamides, quaternaries, ethers, epoxy, phenols, esters, carboxyls, ketones, halogen-substituted alkyls and aryls group. For example, the functional organopolysiloxane may comprise siloxy units having the average formula:

$(R_2SiO)_a(RR^FSiO)_b(RR^{FO}SiO)_c$ wherein the groups and subscripts (that is, a, b and c) are the same define above. The $R^{FO}$ group is a monovalent mercapto-functional organic group ($R^S$), a monovalent vinyl-functional organic group ($R^V$), a monovalent (meth)acrylamide-functional organic group ($R^{AM}$) or a monovalent (meth)acrylate-functional organic group ($R^{MA}$).

Organopolysiloxane (C') may be terminated with a hydrogen atom (resulting in a silanol group on the terminal siloxy unit of the terpolymer), or with an alkyl group containing 1-30 carbon atoms (resulting in an alkoxy group on the terminal siloxy unit of the terpolymer). When an alkyl group is used, the alkyl group can be a linear or branched alkyl, containing 1-30 carbons, alternatively the alkyl group can be a long chain alkyl group of 4-20, alternatively 8-20 carbon atoms such as stearyl. Alternatively the organopolysiloxane can be terminated with a trimethylsilyl group.

The organopolysiloxane (C') of this preferable embodiment can be represented by the following average formula for example;

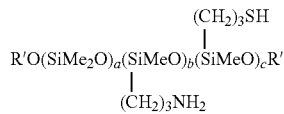

where; a is 0-4000, alternatively 1 to 1000, alternatively 2 to 400, b is 0-1000, alternatively 1 to 100, alternatively 2 to 50, c is 1-1000, alternatively 2 to 100, alternatively 3 to 50;

and R' is H, an alkyl group having 1 to 40 carbon atoms, or $Me_3Si$.

The amino-mercapto-functional organopolysiloxane terpolymers of this preferable embodiment (C') can be prepared by any technique known in the art for preparation of organopolysiloxane terpolymers containing amino and/or mercapto-functional groups. Typically, the organopolysiloxanes (C') are prepared via a condensation polymerization reaction of an amino-functional alkoxy silane, a mercapto-functional silane monomer, and organopolysiloxane having alkoxy or silanol termination as illustrated by the following general reaction scheme.

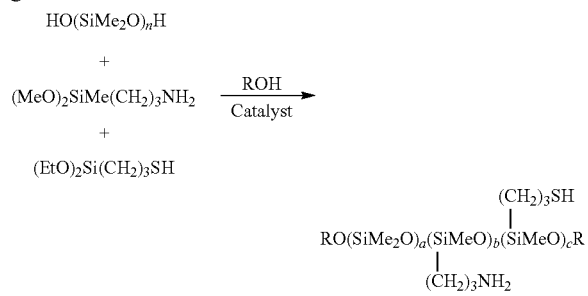

Condensation organopolysiloxanes are well known in the art and are typically catalyzed by the addition of a strong base, such as an alkaline metal hydroxide or a tin compound. Alternatively co-polymerization of the functionalized cyclosiloxanes could be used.

The vinyl group-containing silicone (C) is of, for example, the formula:

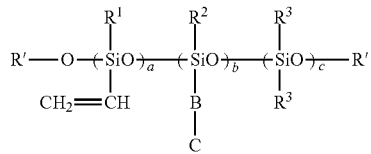

wherein $R^1$ is a methyl group, a methoxy group, a phenyl group, or a hydroxyl group, $R^2$ is a methyl group, a methoxy group, a phenyl group, or a hydroxyl group, $R^3$ is a methyl group, a methoxy group, a phenyl group, or a hydroxyl group, R' is a hydrogen atom, an alkyl group having 1 to 40 carbon atoms, or $Me_3Si$, B is a divalent saturated hydrocarbon group having 1-10 carbon atoms which may be interrupted with one or two ether linkages, C is hydroxyls, amines, amides, sulfonamides, quaternaries, ethers, epoxy, phenols, esters, carboxyls, ketones, halogen-substituted alkyls or aryls group, a, b, and c are integers showing the number of repeat units, a is from 1 to 4000, for example, 2 to 2000, b is from 0 to 1000, preferably from 1 to 800, and c is from 0 to 1000, preferably from 1 to 800.

The example of vinyl group-containing silicone (C) is as follows.

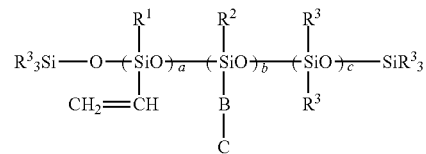

wherein the groups such as the $R^1$ group and the subscripts are defined as the same as above-mentioned.

The functional group C is particularly preferably an amino group (that is, the vinyl group-containing silicone (C) is a vinylamino silicone). The amino group has the effect of remarkably improving the affinity with other materials constituting the cosmetic and with a human body skin.

The organopolysiloxane (C') of the above-mentioned preferable embodiment can be represented by the following average formula for example;

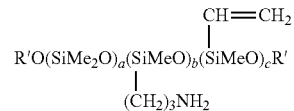

where; a is 0-4000, alternatively 1 to 1000, alternatively 2 to 400, b is 0-1000, alternatively 1 to 100, alternatively 2 to 50, c is 1-1000, alternatively 2 to 100, alternatively 3 to 50;

and R' is H, an alkyl group having 1 to 40 carbon atoms, or $Me_3Si$.

The vinylamino functional organopolysiloxane terpolymers of this preferable embodiment (C') can be prepared by any technique known in the art for preparation of organopolysiloxane terpolymers containing amino and/or vinyl functional groups. Typically, the organopolysiloxanes (C') are prepared via an equilibration polymerization reaction of an amino functional alkoxy silane, 2,4,6,8-tetramethyl-2,4,6,8-tetravinylcyclotetrasiloxane, octamethylcyclotetrasiloxane in the presence of an end-blocking agent such as hexamethyldisiloxane for example, as illustrated by the following general reaction scheme.

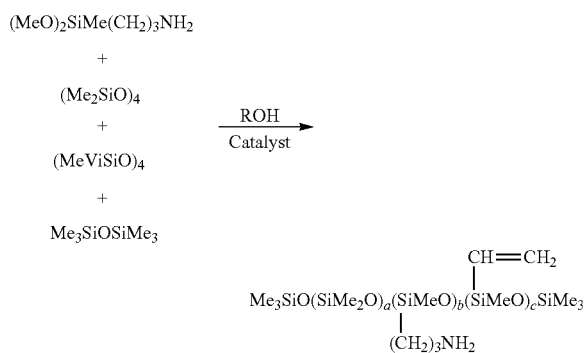

Equilibration prepared organopolysiloxanes are well known in the art and are typically catalyzed by the addition of a strong acid or base, such as an alkaline metal hydroxide or a sulphonic acid. Alternatively co-polymerization of the functionalized alkoxysilanes and silanol terminated polydimethylsiloxanes could be used.

Typically, the (meth)acrylamide-functional organopolysiloxane can be prepared by reacting the amino-functional organopolysiloxane with (meth)acrylic anhydride. In the reaction, amino group (—$NH_2$) is converted into (meth) acrylamide group ((—NH—C(=O)—CQ=$CH_2$ (wherein Q is a hydrogen atom or a methyl group)). For example, the (meth)acrylamide-functional organopolysiloxane may have a ≡Si—$(CH_2)_n$—NH—C(=O)—CQ=$CH_2$ group (wherein Q is a hydrogen atom or a methyl group, and n is the number of 0 to 10, particularly 1 to 5).

Typically, the (meth)acrylate-functional organopolysiloxane can be prepared by reacting a carbinol-functional organopolysiloxane with (meth)acrylic anhydride. In the reaction, with a carbinol functional siloxane, the carbinol group (—OH) is converted into a (meth)acrylate group ((—O—C(=O)—CQ=$CH_2$ (wherein Q is a hydrogen atom or a methyl group)). For example, the methacrylate-functional organopolysiloxane may have a ≡Si—$(CH_2)_n$—O—C(=O)—CQ=$CH_2$ group (wherein Q is a hydrogen atom or a methyl group, and n is the number of 0 to 10, particularly 1 to 5).

The fluorine-containing polymer may have a weight-average molecular weight of 2,000 to 5,000,000, particularly 3,000 to 5,000,000, especially 10,000 to 1,000,000. The weight-average molecular weight (in terms of polystyrene) of the fluorine-containing polymer can be determined by GPC (Gel Permeation Chromatography).

In the fluorine-containing polymer, the repeating units may not be positioned as shown in the chemical formulas, and the fluorine-containing polymer may be a random polymer or block copolymer.

The fluorine-containing polymer of the present invention can be produced in the presence of the functional organopolysiloxane and the blocked isocyanate.

The fluorine-containing polymer of the present invention can be produced by bulk polymerization, solution polymerization and emulsion polymerization. The emulsion polymerization is preferable.

In the bulk polymerization, a method is adopted in which a mixture of the monomers, the functional organopolysiloxane and optionally the blocked isocyanate is purged by nitrogen, a polymerization initiator is then added, and the mixture is stirred in the range of from 30 to 80° C. for several (2 to 15) hours to be polymerized. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of the monomers.

In the case of the solution polymerization, the mixture of the monomers, the functional organopolysiloxane and optionally the blocked isocyanate is dissolved in a suitable organic solvent in which these can dissolve and to which these are inert, and then polymerized in the same manner as described earlier. Examples of the organic solvent include a hydrocarbon-based solvent, an ester-based solvent, a ketone-based solvent, an alcohol-based solvent, a silicone-based solvent, and a fluorine-containing solvent. The organic solvent is inert to the monomer and dissolves the monomer, and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In the solution polymerization, there can be used a method of dissolving the monomer(s) into an organic solvent in the presence of a polymerization initiator, replacing the atmosphere by nitrogen, and stirring the mixture with heating, for example, at the temperature within the range from 30 degrees C. to 120 degrees C. for 1 hour to 10 hours.

In the case of the emulsion polymerization, the polymerization is carried out in the same manner as described above after emulsifying a mixture of the monomers and the functional organopolysiloxane in water using a proper emulsifier. In some combinations of the monomers (a) to (c) and the functional organopolysiloxane, a poor compatibility of the monomers and the functional organopolysiloxane in water results in a poor copolymerizability. In such a case, a method in which a proper auxiliary solvent such as glycols and alcohols and/or a low molecular weight monomer is added to improve the compatibility of the mixture is adopted. A hydrophobic group in the emulsifier to be used in the emulsion polymerization may be any of hydrocarbon type, silicon-containing type and fluorine-containing type. As for the ionicity of a hydrophilic group, any of nonionic one, anionic one, cationic one and amphoteric one may be used. As the polymerization initiator for emulsion polymerization, for example, water-soluble initiators (e.g., 1-hydroxycyclohexyl hydroperoxide, 3-carboxy-propionyl peroxide, acetyl peroxide, azobisisobutylamidine dihydrochloride, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In the emulsion polymerization, there can be used a method of emulsifying monomers in water in the presence of a polymerization initiator and an emulsifying agent, replacing the atmosphere by nitrogen, and polymerizing with stirring, for example, at the temperature within the range from 30 degrees C. to 120 degrees C., for example, from 50 degrees C. to 80 degrees C., for 1 hour to 10 hours.

When the monomers are not completely compatibilized, a compatibilizing agent capable of sufficiently compatibilizing them (e.g., a water-soluble organic solvent and a low-molecular weight monomer) is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol and 3-methoxy-3-methyl-1-butanol. The water-soluble organic solvent may be used in the amount within the range from 1 to 50 parts by weight, e.g., from 10 to 40 parts by weight, based on 100 parts by weight of water. Examples of the low-molecular weight monomer are methyl methacrylate, glycidyl methacrylate, 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The emulsifying agent used in the emulsion polymerization may have a hydrophobic group which may be a hydrocarbon, a silicone or a fluorine-containing compound, and hydrophilic group which may be nonionic, anionic, cationic or amphoteric. The nonionic emulsifying agent and a combination of the cationic emulsifying agent and the nonionic emulsifying agent are preferable in order to obtain both the stability of the emulsion and safety to skin. The amount of the anionic emulsifying agent is from 5 to 80% by weight, preferably from 10 to 60% by weight, based on the total of the anionic emulsifying agent and the nonionic emulsifying agent. Preferably, the anionic emulsifying agent is polyoxyethylene alkyl (preferably $C_1$ to $C_{30}$ alkyl)ether sulfate salt, and the nonionic emulsifying agent is fatty acid sorbitan ester, polyoxyethylene fatty acid sorbitan ester, polyoxyethylene hardened castor oil and/or polyoxyethylene fatty acid sorbit ester. Preferable examples of the cationic emulsifying agent include stearyltrimethyl ammonium chloride and distearyldimethyl ammonium chloride.

In order to obtain a polymer dispersion in water, which has a high polymer solid content and which has very fine and stable particles, it is desirable that the mixture of the monomers and the functional organopolysiloxane is dispersed in water by using an emulsifying device capable of applying a strong shearing energy (e.g., a high-pressure homogenizer and an ultrasonic homogenizer) to prepare the fine particles of the mixture, and then the polymerization is conducted.

The fluorine-containing polymer (I) is preferably in the form of fine particles in a medium, particularly a liquid medium such as an aqueous medium. An average particle diameter of the fluorine-containing polymer (I) is preferably 0.0001 to 1 micrometer, for example, 0.01 to 0.5 micrometers. In this range of the average particle diameter, an amount of the emulsifying agent is low for the purpose of obtaining a stable dispersion, the excellent water- and oil repellency can be obtained and polymer particles can be present stably. The average particle diameter can be measured by a dynamic light scattering spectrophotometer and an electron microscope. A usual emulsion polymerization can give the average particle diameter of 0.0001 to 1 micrometer by conducting the polymerization in the presence of an emulsifying agent.

The fluorosilicone reaction product of the monomer (A) and the organopolysiloxane (C) may be prepared by any reaction process known in the art to effect polymerisation of such monomers. Preferably, the fluorosilicone may be prepared according to the process of the present invention comprising;
I) reacting,
(A) a monomer comprising a fluorine-containing monomer of the formula:

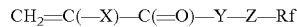
$$CH_2=C(-X)-C(=O)-Y-Z-Rf$$

wherein X is a monovalent organic group other than methyl group, or a halogen atom,
Y is —O— or —NH—,
Z is a direct bond or a divalent organic group, and
Rf is a fluoroalkyl group having 1 to 20 carbon atoms,
in the presence of
(B) a blocked isocyanate, and
(C) a functional organopolysiloxane,
via a polymerization reaction, preferably a free radical polymerisation reaction.

Components (A), (B) and (C) in the process are the same as described above.

The process may also be conducted in the presence of a polar organic solvent. The polar organic solvent can be one or more alcohol, ketone or ester solvents selected from butanol, t-butanol, isopropanol, butoxyethanol, methyl isobutyl ketone, methyl ethyl ketone, butyl acetate or ethyl acetate and/or an aromatic hydrocarbon such as xylene, toluene or trimethylbenzene a blend of one or more of these.

The initiator for the free radical polymerisation reaction can be any compound known in the art for initiating free radical reactions, such as organic peroxides or azo compounds. Representative, non-limiting examples are; azo compounds such as azobisisobutyronitrile or azobisisovaleronitrile (AIVN), peroxides such as benzoyl peroxide. The polymerisation temperature typically ranges 50-120° C.

Alternatively the polymeric reaction product can be obtained using the technique of emulsion polymerisation, where all the components are polymerised in the presence of water, surfactants and polymerisation initiator.

The fluorosilicone reaction product can contain various ratios of the monomer (A) and the organopolysiloxane (C), as controlled by the amount of each of components (A) and (C). The fluorosilicone may contain 5 to 99.9% by weight, preferably 10 to 95% by weight of the monomer (A), and 0.1 to 95% by weight, preferably 5 to 90% by weight of the organopolysiloxane (C) with the proviso that sum of the wt % of (A) and (C) equals 100%. A fluorosilicone product having a high proportion of organopolysiloxane may provide greater substantivity to fibrous substrates or softness of hand of the treated material. A polymeric product having a high proportion of fluorine-containing monomer may provide maximum hydrophobicity and oleophobicity.

A weight ratio of the monomer (A) to the blocked isocyanate (B) is not limited, but may be 99.9:0.1 to 10:90, for example, 99:1 to 70:30.

The fluorosilicone reaction product is generally obtained as a solution. It can be isolated by evaporation of the solvent. For application as an oil repellent, the fluorosilicone reaction product is generally required in liquid form and the solution obtained by reaction can often be diluted to a solution suitable for application to textiles. Alternatively the fluorosilicone reaction product can be dissolved in a different solvent for application to textiles, for example in a polar organic solvent of higher boiling point. The fluorosilicone reaction product can alternatively be emulsified by mixing with water and an emulsifying agent, such as a cationic surfactant and/or a nonionic or anionic surfactant. The fluorosilicone reaction product can be isolated before emulsification or the polymerisation product solution can be emulsified, optionally with removal of solvent. If the polymeric product is obtained by emulsion polymerisation, the emulsion is generally used, diluted as required, without isolating the polymeric product.

Surface Treatment Agent

The water- and oil-repellent composition can be applied to fibrous substrates such as textiles by any of the methods known for treatment of textiles with liquids. The concentration of the fluorine-containing polymer in the composition applied to the textile can be for example 0.1 to 10% by weight, preferably 0.2 to 2% by weight, based on the textile. When the textile is a fabric, the fabric can be immersed in the liquid or can be padded or sprayed with the liquid. The treated textile is dried and is preferably heated, for example at 100-200° C., to develop the water and oil repellency.

Alternatively, the fluorosilicone reaction product can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil repellent. The process of the invention generally also renders the textile hydrophobic and water repellent. Fabric treatment with the polymeric product of the invention imparts water and oil repellency to fabrics whilst at the same time imparting an improvement in feel compared to untreated fabric and also imparting an improvement in feel compared to fabric treated with known fluoropolymer textile treatment agents.

The fibrous substrate can alternatively be leather. The polymeric product can be applied to leather from aqueous solution or emulsion at various stages of leather processing, for example during leather wet end processing or during leather finishing, to render the leather hydrophobic and oleophobic.

The fibrous substrate can alternatively be paper. The polymeric product can be applied to preformed paper or at various stages of papermaking, for example during drying of the paper.

The surface treatment agent of the present invention is preferably in the form of a solution, an emulsion or an aerosol. The surface treatment agent generally comprises the fluorine-containing polymer and a medium (such as a liquid medium, particularly an aqueous medium, for example, water or a mixture of water and an organic solvent). The organic solvent in the aqueous medium is generally a water-soluble organic solvent. An amount of the organic solvent may be at most 40% by weight, for example, 0.1 to 20% by weight, based on the medium. The concentration of the fluorine-containing polymer in the surface treatment agent may be, for example, from 0.1 to 50% by weight.

The surface treatment agent can be applied to a substrate to be treated by a know procedure. The application of the surface treatment agent can be conducted by immersion, spraying and coating. Usually, the surface treatment agent is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent, followed by curing. It is also possible to add mothproofing agents, softeners, antimicrobial agents, flame retardants, antistatic agents, paint fixing agents, crease-proofing agents, etc. to the surface treatment agent. The concentration of the fluorine-containing compound in the treatment liquid contacted with the substrate may be from 0.01 to 10% by weight (particularly for immersion coating), for example, from 0.05 to 10% by weight (particularly for spray coating), based on the treatment liquid.

The substrate to be treated with the surface treatment agent (for example, a water- and oil-repellent agent) of the present invention is preferably a textile. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers.

The textile may be in any form such as a fiber, a yarn and a fabric.

The term "treatment" means that the treatment agent is applied to the substrate by immersion, spray, coating or the like. The fluorine-containing polymer which is an active component of the treatment agent can penetrate the internal of the substrate or can adhere on the surface of the substrate by the treatment.

EXAMPLES

The following Preparative Examples and Examples further illustrate the present invention in detail but are not to be construed to limit the scope thereof. All parts and percentages in the examples are on a weight basis and all measurements were obtained at about 23° C., unless indicated to the contrary.

Shower (Spray) Water Repellency Test (JIS-L-1092)

Shower water repellency test was conducted according to JIS-L-1092. The shower water repellency was expressed by water repellency No. (as shown in the below-described Table 1).

A glass funnel which has a volume of at least 250 ml and a spray nozzle which can spray 250 ml of water for 20-30 seconds are used. A test piece frame is a metal frame having a diameter of 15 cm. Three sheets of a test piece having a size of about 20 cm×20 cm are prepared and the sheet is mounted on a test piece holding frame so that the sheet has no wrinkle. The center of the spray was located on the center of the sheet. Room temperature water (250 mL) is charged into the glass funnel and sprayed on the test piece sheet (for time of 25-30 seconds). The holding frame is removed from a stand, one edge of the holding frame is grasped so that a front surface is downside and the other edge is lightly hit with a stiff substance. The holding frame is further rotated 180° and the same procedure is repeated to drop excess water droplets. The wet test piece is compared with a wet comparison standard to grade 0, 50, 70, 80, 90 and 100 points in order of poor water-repellency to excellent water repellency. The results are obtained from an average of the measurements.

TABLE 1

| Water repellency No. | State |
|---|---|
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

Oil-repellency Test (According to AATCC Test Method 118-1992)

A treated fabric is stored in a thermo-hygrostat having a temperature of 21° C. and a humidity of 65% for at least 4 hours. A test liquid (shown in Table 2) which has been also stored at 21° C. is used. The test is conducted in an air-conditioned room having a temperature of 21° C. and a humidity of 65%. Five droplets of the test liquid wherein one droplet has an amount of 50 μL are softly dropped by a micropipette on the fabric. If 4 or 5 droplets remain on the fabric after standing for 30 seconds, the test liquid passes the test. The oil-repellency is expressed by a maximum point of the test liquid which passes the test. The oil-repellency is evaluated as nine levels which are Fail (or 0), 1, 2, 3, 4, 5, 6, 7 and 8 in order of a bad level to an excellent level.

TABLE 2

Oil-repellency test liquid

| Point | Test liquid | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| Fail (or 0) | Inferior to 1 | — |

Bundesmann Water Repellency Test

A fabric is immersed in the treatment liquid, squeezed with a mangle, dried, and heated, and then the treated fabric was subjected to the evaluation of Bundesmann water repellency test according to DIN 53888.

Water repellency, a water absorption amount (a water absorption ratio), a water leakage amount were measured after 10 minutes of shower according to Bundesmann test method.

Washing Durability of Water- and Oil-repellency

Washing is conducted repeatedly ten times or twenty times according to JIS L-0217-103 method, and then water- and oil-repellency is evaluated (HL10 or HL20). HL0 (or "Initial") means that the evaluation is made after no washing.

Synthesis of Aminomercapto-functional Siloxane: Siloxane A

Into a three necked round bottomed flask fitted with a condenser, overhead stirrer and thermocouple were charged first silanol-terminated polydimethylsiloxane (323 g, Mn: about 900), second silanol-terminated polydimethylsiloxane (380 g, Mn: about 300), mercaptopropylmethyldimethoxysilane (230 g), aminopropylmethyldiethoxysilane (27 g), trimethylethoxysilane (42 g), barium hydroxide (0.62 g) and sodium orthophosphate (0.25 g). The reaction mixture was heated to 75° C. and held at this temperature for three hours. Then the volatiles were removed under reduced pressure (200 mbar) at 75° C. for four hours to yield an aminomercaptosiloxane.

The physical and structural properties of the aminomercaptosiloxane are described in the table below:

TABLE 3

| | Mn | Viscosity (cSt) | % N (w/w) | % SH (w/w) | % (SiMe$_3$ terminal group) | % (OR terminal group or SiOH terminal group) |
|---|---|---|---|---|---|---|
| Siloxane A | 4396 | 74 | 0.26 | 4.10 | 9 | 91 |

Example 1

Polymerization in the Presence of Blocked Polyisocyanate

Into a polyethylene vessel, 3,3,4,4,5,5,6,6,7,7,8,8,8-tridecafluorooctyl 2-chloroacrylate (SFC1A) (56.16 g), isobornyl methacrylate (IBMA) (8.6 g), stearyl acrylate (StA) (4.31 g), diacetone acrylamide (DAAM) (0.86 g), 2-hydroxypropyl methacrylate (HPMA) (0.86 g), Siloxane A (8.6 g), a 70% solution of DESMODUR VPLS2253/1 in dipropyleneglycol monomethyl ether (DPM) (15.17 g), 3-methoxy-3-methyl-1-butanol (16.68 g), CATION 2ABT (0.99 g), NONION EAD-16 (2.12 g), NONION EAD-8 (2.31 g), BO-50 (1.06 g), deionized water having a temperature of 60° C. (167.9 g) were charged and heated at 60° C. for 10 minutes, and then premixed by a homomixer at 5000-10000 rpm for 1 minute and emulsified by ultrasonic wave for 8 minutes.

The resultant emulsion was transferred into a 500 cc autoclave, and the content in the autoclave was replaced three times with nitrogen. A vinyl chloride monomer (VCM) (21.52 g) was charged and an aqueous solution of 2,2'-azobis (2-amidinopropane)dihydrochloride (V-50) (V-50:1.34 g+deionized water: 7.36 g) was injected with nitrogen. The temperature of the mixture was increased and the reaction was conducted at 60° C. for 4 hours to give a polymerization mixture. After the polymerization reaction, a remaining vinyl chloride monomer was excluded from the system and the resultant aqueous dispersion was cooled to a room temperature (23° C.). The resultant aqueous dispersion was diluted with deionized water to adjust the solid content to 20%, whereby giving Aqueous Dispersion 1.

An elemental analysis of the polymer and the resultant polymerization mixture revealed that about 75% of vinyl chloride and about 100% of other monomers were reacted.

Examples 2 and 3

The ingredients shown in Table 4 were polymerized in the same manner as in Example 1, and diluted with water to give Aqueous Dispersions 2 and 3 having a solid content of 20%.

Comparative Examples C1, C2 and C3

The ingredients shown in Table 4 were polymerized in the same manner as in Example 1, and diluted with water to give Aqueous Dispersions C1, C2 and C3 having a solid content of 20%.

Polymerization Example 1 and Comparative Examples C4

The ingredients shown in Table 4 were polymerized in the same manner as in Example 1 except that the blocked isocyanate was omitted, and diluted with water to give Aqueous Dispersions P1 and C4 having a solid content of 20%.

temperature and subjected to the water repellency test, the oil repellency test and the Bundesmann water repellency test, the results thereof also are in Tables 5 and 6 (HL10 and HL20).

The same manner as in the above was repeated for each of a nylon taffeta (The wet pickup was about 23%) fabric and a cotton twill fabric (The fabric was immersed in a treatment liquid having a solid content of 1.5%, the wet

TABLE 4

|  |  | Example 1 | Example 2 | Example 3 | Polymerization. Ex. 1 | Com. Ex. 1 | Com. Ex. 2 | Com. Ex. 3 | Com. Ex. 4 |
|---|---|---|---|---|---|---|---|---|---|
| Fluorine-containing polymer/ Blocked isocyanate (wt %/wt %) |  | 90/10 | 90/10 | 90/10 | 100/0 | 90/10 | 90/10 | 90/10 | 100/0 |
| SFClA | (g) | 56.16 | 56.52 | 56.51 | 62.4 |  |  |  |  |
| 13FMA | (g) |  |  |  |  | 56.16 | 56.16 | 56.16 | 56.16 |
| IBMA | (g) | 8.6 | 8.6 | 8.6 | 9.56 | 8.68 | 8.68 | 8.68 | 8.6 |
| StA | (g) | 4.31 | 4.31 | 4.31 | 4.79 | 4.31 | 4.31 | 4.31 | 4.31 |
| DAAM | (g) | 0.86 |  |  | 1.91 | 0.86 | 0.86 |  |  |
| HPMA | (g) | 0.86 |  |  |  | 0.86 | 0.86 |  |  |
| VCM | (g) | 21.52 | 21.52 | 21.52 | 23.91 | 21.52 | 21.52 | 21.52 | 21.52 |
| PLAXEL FM2D | (g) |  | 1.72 | 1.72 |  |  |  | 1.72 | 1.72 |
| Siloxane A | (g) | 8.6 | 8.6 | 8.6 | 9.54 | 8.6 | 8.6 | 8.6 | 8.6 |
| CATION 2ABT | (g) | 0.99 | 0.99 | 0.99 |  | 0.99 |  | 0.99 |  |
| MPS acetate salt | (g) |  |  |  | 0.74 |  | 0.74 |  | 0.74 |
| NONION EAD-8 | (g) | 2.31 | 2.31 | 2.31 | 1.9 | 2.31 | 2.84 | 2.31 | 2.84 |
| NONION EAD-16 | (g) | 2.12 | 2.12 | 2.12 |  | 2.12 | 2.12 | 2.12 | 2.12 |
| BO-50 | (g) | 1.06 | 1.06 | 1.06 | 2.97 | 1.06 | 0.53 | 1.06 | 0.53 |
| DPM | (g) |  |  | 15.51 | 25.79 |  |  |  |  |
| MMB (or SOLFIT) | (g) | 16.68 | 16.68 |  |  | 16.68 | 15.51 | 16.68 | 16.68 |
| DESMODUR VPLS2253/1* | (g) | 15.17 | 15.17 |  |  | 15.17 |  | 15.17 |  |
| TRIXENE BI 7951 | (g) |  |  | 16.33 |  |  | 16.33 |  |  |
| V-50 | (g) | 1.34 | 1.34 | 1.34 | 0.32 | 1.34 | 1.34 | 1.34 | 1.34 |
| Deionized water | (g) | 175.26 | 175.26 | 175.26 | 175.26 | 175.26 | 175.3 | 175.26 | 175.26 |

*DESMODUR VPLS2253/1 was desolvated and then dissolved in DPM to give a 70% DPM solution.

| Abbreviation or Trade name | Compound name | Supplier |
|---|---|---|
| SFClA | 3,3,4,4,5,5,6,6,7,7,8,8,8-tridecafluorooctyl 2-chloroacrylate |  |
| 13FMA | 2-(Perfluorohexyl)ethyl methacrylate |  |
| IBMA | Isobornyl methacrylate |  |
| StA | Stearyl acrylate |  |
| VCM | Vinyl chloride |  |
| DAAM | Diacetone acrylamide |  |
| HMPA | 2-hydroxypropyl methacrylate |  |
| PLAXEL FM2D | Caprolactone (2 mol) addition product of hydroxyethyl methacrylate | Daicel Chemical Industries, Ltd. |
| Siloxane A | Aminomercapto siloxane | Dow Corning |
| MPS acetate salt | Salt of stearic acid dimethylaminopropylamide neutralized with acetic acid |  |
| CATION 2ABT | Di-harden tallow alkyl dimethyl ammonium chloride | NOF Corporation |
| NONION EAD-8 | Nonionic emulsifier (HLB = 8) | NOF Corporation |
| NONION EAD-16 | Nonionic emulsifier (HLB = 16.3) | NOF Corporation |
| BO-50 | Polyoxyethylene (50 mol) oleyl ether | Nikko Chemicals Co., Ltd. |
| TRIXENE BI 7951 | IPDI trimer blocked with dimethyl pyrazole | Baxenden Chemicals Limited |
| DESMODUR VPLS2253/1 | HDI trimer blocked with dimethyl pyrazole | Sumika Bayer Urethane Co., Ltd. |
| ELASTRON BN-69 | Aromatic isocyanate blocked with methyl ethyl ketoxime | Dai-ichi Kogyo Seiyaku Co., Ltd. |
| Arkophob DAN liq | HDI trimer blocked with dimethyl pyrazole | Clariant Produkute AG |
| DPM | Dipropyleneglycol monomethyl ether |  |
| MMB (or SOLFIT) | 3-methoxy-3-methyl-1-butanol |  |
| V-50 | 2,2'-azobis(2-amidinopropane) dihydrochloride | Wako Pure Chemical Industries, Ltd. |

Test Example 1

Aqueous Dispersion 1 prepared in Example 1 having a solid content of 20% was diluted with water to give a treatment liquid having a solid content of 1%. A polyester taffeta fabric was immersed with the treatment liquid and squeezed with a mangle. A wet pickup was about 35% by weight. The treated fabric was passed through a pin tenter at 170° C. for 1 minute, to be dried and cured. The treated fabric was subjected to the water repellency test, the oil repellency test and the Bundesmann water repellency test. The results are shown in Tables 5 and 6 (Initial). The fabric was washed ten times or twenty times, dried at a room pickup was about 62%, and the fabric was passed through a pin tenter at 160° C. for 3 minutes, to be dried and cured). The results are shown in Tables 5 and 6.

Test Examples 2 and 3

In the same manner as in Test Example 1, except that each of Aqueous Dispersions 2 and 3 was used instead of Aqueous Dispersion 1, each of a polyester taffeta fabric, a nylon taffeta fabric and a cotton twill fabric was treated, and water repellency, oil repellency and the Bundesmann water repellency were evaluated. Results are shown in Tables 5 and 6.

Test Example 4

(i) Aqueous Dispersion P1 prepared in Polymerization Example 1 and (ii) Arkophob DAN liq (manufactured by Clariant Produkute AG) were diluted with water to give a treatment liquid having a solid content of 0.9% for Aqueous Dispersion P1 and 0.1% for Arkophob DAN (total solid content of 1.0%).

In the same manner as in Test Example 1, except that the resultant treatment liquid was used instead of Aqueous Dispersion 1, each of a polyester taffeta fabric, a nylon taffeta fabric and a cotton twill fabric was treated, and water repellency, oil repellency and the Bundesmann water repellency were evaluated. Results are shown in Tables 5 and 6.

Comparative Test Examples 1, 2 and 3

In the same manner as in Test Example 1, except that each of Aqueous Dispersions C1, C2 and C3 was used instead of Aqueous Dispersion 1, each of a polyester taffeta fabric, a nylon taffeta fabric and a cotton twill fabric was treated, and water repellency, oil repellency and the Bundesmann water repellency were evaluated. Results are shown in Tables 5 and 6.

Comparative Test Example 4

(i) Aqueous Dispersions C4 prepared in Comparative Example 4 and (ii) ELASTRON BN-69 (manufactured by Dai-Ichi Kogyo Seiyaku Co., Ltd.) were diluted with water to give a treatment liquid having a solid content of 0.9% for Aqueous Dispersions C4 and 0.1% for ELASTRON BN-69 (total solid content of 1.0%).

In the same manner as in Test Example 1, except that the resultant treatment liquid was used instead of Aqueous Dispersion 1, each of a polyester taffeta fabric, a nylon taffeta fabric and a cotton twill fabric was treated, and water repellency, oil repellency and the Bundesmann water repellency were evaluated. Results are shown in Tables 5 and 6.

TABLE 5

Shower water repellency and Oil repellency

|  |  | Test Ex. 1 | Test Ex. 2 | Test Ex. 3 | Test Ex. 4 | Com. Test Ex. 1 | Com. Test Ex. 2 | Com. Test Ex. 3 | Com. Test Ex. 4 |
|---|---|---|---|---|---|---|---|---|---|
| Polyester taffeta | Initial | 100/2 | 100/2 | 100/2 | 100/4 | 100/2 | 100/3 | 100/2 | 100/3 |
|  | HL10 | 100/0 | 90/0 | 90/0 | 90/0 | 90/0 | 90/0 | 90/0 | 90/1 |
|  | HL20 | 90/0 | 90/0 | 90/0 | 80/0 | 80/0 | 90/0 | 80/0 | 80/1 |
| Nylon taffeta | Initial | 100/2 | 100/2 | 100/2 | 100/3 | 100/2 | 100/2 | 100/2 | 100/2 |
|  | HL10 | 100/0 | 90/0 | 90/0 | 90/0 | 80/0 | 80/0 | 80/0 | 80/0 |
|  | HL20 | 90/0 | 90/0 | 80/0 | 90/0 | 80/0 | 80/0 | 80/0 | 70/0 |
| Cotton twill | Initial | 100/2 | 90/2 | 90/2 | 100/4 | 100/3 | 100/5 | 100/3 | 100/5 |
|  | HL10 | 80/0 | 80/0 | 80/0 | 80/0 | 80/1 | 80/0 | 80/1 | 80/3 |
|  | HL20 | 80/0 | 80/0 | 70/0 | 70/0 | 70/1 | 70/0 | 70/1 | 80/2 |

TABLE 6

Bundesmann water repellency

|  |  |  | Test Ex. 1 | Test Ex. 2 | Test Ex. 3 | Test Ex. 4 | Com. Test Ex. 1 | Com. Test Ex. 2 | Com. Test Ex. 3 | Com. Test Ex. 4 |
|---|---|---|---|---|---|---|---|---|---|---|
| Nylon taffeta | Initial | Water repellency | 90 | 90 | 90 | 100 | 80 | 80 | 80 | 70 |
|  |  | Water absorption ratio (%) | 2 | 4 | 3 | 4 | 5 | 4 | 4 | 9 |
|  |  | Water leakage amount (g) | 11 | 11 | 11 | 12 | 10 | 12 | 10 | 14 |
|  | HL10 | Water repellency | 70 | 70 | 70 | 80 | 0 | 0 | 0 | 0 |
|  |  | Water absorption ratio (%) | 14 | 12 | 7 | 10 | 17 | 15 | 16 | 13 |
|  |  | Water leakage amount (g) | 23 | 24 | 22 | 18 | 39 | 54 | 40 | 46 |
|  | HL20 | Water repellency | 0 | 0 | 0 | 0 | — | — | — | — |
|  |  | Water absorption ratio (%) | 20 | 18 | 18 | 20 | — | — | — | — |
|  |  | Water leakage amount (g) | 31 | 31 | 37 | 48 | — | — | — | — |
| Polyester taffeta | Initial | Water repellency | 90 | 90 | 90 | 100 | 100 | 100 | 100 | 90 |
|  |  | Water absorption ratio (%) | 2 | 2 | 1 | 1 | 1 | 1 | 1 | 3 |
|  |  | Water leakage amount (g) | 0 | 0 | 0 | 0 | 0 | 0 | 0 | 0 |
|  | HL10 | Water repellency | 90 | 90 | 90 | 80 | 0 | 0 | 0 | 0 |
|  |  | Water absorption ratio (%) | 14 | 15 | 14 | 16 | 18 | 13 | 16 | 15 |
|  |  | Water leakage amount (g) | 1 | 1 | 2 | 0 | 2 | 1 | 2 | 2 |
|  | HL20 | Water repellency | 70 | 50+ | 0 | 0 | — | — | — | — |
|  |  | Water absorption ratio (%) | 23 | 23 | 24 | 23 | — | — | — | — |
|  |  | Water leakage amount (g) | 1 | 1 | 1 | 1 | — | — | — | — |

The invention claimed is:

1. A fluorine-containing polymer prepared by polymerizing a monomer comprising:
(I) a polyfluoroalkyl group-containing acrylate which is substituted at the alpha-position with a monovalent organic group other than a methyl, or with a halogen atom, wherein the polyfluoroalkyl group has 1 to 6 carbon atoms,
wherein the polyfluoroalkyl group-containing acrylate (I) comprises a compound of the formula:

$$CH_2=C(-X)-C(=O)-Y-Z-Rf \qquad (I)$$

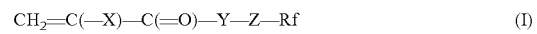

wherein X is a monovalent organic group other than a methyl group, or a halogen atom;
Y is —O— or —NH—;

Z is a direct bond, an aliphatic group having 1 to 10 carbon atoms, an aromatic or cycloaliphatic group having 6 to 18 carbon atoms, a —CH$_2$CH$_2$N(R$^1$)SO$_2$— group (wherein R$^1$ is an alkyl group having 1 to 4 carbon atoms), a —CH$_2$CH(OZ$^1$)CH$_2$— group (wherein Z$^1$ is a hydrogen atom or an acetyl group), a —(CH$_2$)$_m$—SO$_2$—(CH$_2$)$_n$— group, or a —(CH$_2$)$_m$—S—(CH$_2$)$_n$— group (wherein m is from 1 to 10 and n is from 0 to 10); and Rf is a linear or branched polyfluoroalkyl group having 1 to 6 carbon atoms;

in the presence of:

(II) a blocked isocyanate compound, wherein a blocking agent in the isocyanate compound (II) is a pyrazole or an active methylene-containing compound, and (III) a functional organopolysiloxane, wherein the functional organopolysiloxane (III) is a functional organopolysiloxane comprising siloxy units having the average formula:

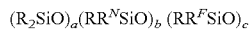

wherein a is 0-4000, b is 0-1000, c is 1-1000,

R is independently a monovalent organic group,

R$^N$ is a monovalent amino-functional organic group, and

R$^F$ is a monovalent mercapto-, vinyl-, (meth)acrylamide- or (meth)acrylate-functional organic group; and wherein the functional organopolysiloxane bonds to the fluorine-containing polymer through a functional organic group, and wherein the blocked isocyanate compound is a compound having a blocked isocyanate group and no polymerizible unsaturated group.

2. The polymer according to claim 1, wherein the Rf group in the polyfluoroalkyl group-containing acrylate (I) is a perfluoroalkyl group.

3. The polymer according to claim 1, wherein the blocking agent in the isocyanate compound (II) is a pyrazole compound of the formula:

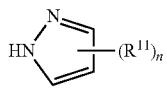

wherein each of R$^{11}$ is, the same or different, an alkyl group, an alkenyl group, an aralkyl group, N-substituted carbamyl group, a phenyl group, NO$_2$, a halogen atom or a —C(=O)OR$^{12}$ group wherein R$^{12}$is an alkyl group having 1 to 4 carbon atoms, and n is 0, 1, 2 or 3.

4. The polymer according to claim 1, wherein the isocyanate compound (II) is a compound of the formula:

A-Y$_m$ wherein A is a m-valent aliphatic group, alicyclic group, heterocyclic group or aromatic group, Y is, the same or different,

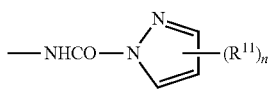

in which each of R$^{11}$ is, the same or different, an alkyl group, an alkenyl group, an aralkyl group, N-substituted carbamyl group, a phenyl group, NO$_2$, a halogen atom or a —C(=O)OR$^{12}$ group wherein R$^{12}$ is an alkyl group having 1 to 4 carbon atoms, and n is 0, 1, 2 or 3; or

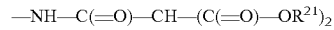

R$^{21}$ is a hydrocarbon group having 1 to 30 carbon atoms, or a monovalent moiety containing a hydrophilic group, and m is 1 to 10; or

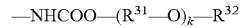

R$^{31}$ is an alkylene group having 2 to 5 carbon atoms,

R$^{32}$ is a C1-C10 aliphatic (or alkyl) group, and k is 2 to 50.

5. A water- and oil-repellent composition comprising a fluorine-containing polymer having repeating units derived from a monomer comprising:

(I) a polyfluoroalkyl group-containing acrylate which is substituted at the alpha-position with a monovalent organic group other than a methyl, or with a halogen atom, wherein the polyfluoroalkyl group has 1 to 6 carbon atoms, wherein the polyfluoroalkyl group-containing acrylate (I) comprises a compound of the formula:

wherein X is a monovalent organic group other than a methyl group, or a halogen atom;

Y is —O— or —NH—;

Z is a direct bond, an aliphatic group having 1 to 10 carbon atoms, an aromatic or cycloaliphatic group having 6 to 18 carbon atoms, a —CH$_2$CH$_2$N(R$^1$)SO$_2$— group (wherein R$^1$ is an alkyl group having 1 to 4 carbon atoms), a —CH$_2$CH(OZ$^1$)CH$_2$— group (wherein Z$^1$ is a hydrogen atom or an acetyl group), a —(CH$_2$)$_m$—SO$_2$—(CH$_2$)$_n$- group, or a —(CH$_2$)m—S—(CH$_2$)$_n$- group (wherein m is from 1 to 10 and n is from 0 to 10); and Rf is a linear or branched polyfluoroalkyl group having 1 to 6 carbon atoms;

wherein the water- and oil-repellent composition comprises:

(II) a blocked isocyanate compound, wherein a functional organopolysiloxane (III) bonds to the fluorine-containing polymer through a functional organic group, wherein the functional organopolysiloxane (III) is a functional organopolysiloxane comprising siloxy units having the average formula:

wherein a is 0-4000, b is 0-1000, c is 1-1000,

R is independently a monovalent organic group,

R$^N$ is a monovalent amino-functional organic group, and

R$^F$ is a monovalent mercapto-, vinyl-, (meth)acrylamide- or (meth)acrylate-functional organic group; and wherein the blocked isocyanate compound is a compound having a blocked isocyanate group and no polymerizible unsaturated group, wherein a blocking agent in the blocked isocyanate compound is a pyrazole or an active methylene-containing compound.

6. A water- and oil-repellent composition comprising the fluorine-containing polymer according to claim 1.

7. The water- and oil-repellent composition according to claim 6, which comprises a cluster formed by the fluorine-containing polymer and the blocked isocyanate compound.

8. A water- and oil-repellent composition comprising a fluorine-containing polymer and a blocked isocyanate compound, wherein the fluorine-containing polymer has repeating units derived from a monomer comprising a polyfluoroalkyl group-containing (meth)acrylate substituted at the alpha-position with a monovalent organic group other than a methyl, or with a halogen atom, wherein the polyfluoroalkyl group has 1 to 6 carbon atoms, wherein the polyfluoroalkyl group-containing (meth)acrylate (I) comprises a compound of the formula:

CH$_2$=C(—X)—C(=O)—Y—Z—Rf    (I)

wherein X is a monovalent organic group other than a methyl group, or a halogen atom;

Y is —O— or —NH—;

Z is a direct bond, an aliphatic group having 1 to 10 carbon atoms, an aromatic or cycloaliphatic group having 6 to 18 carbon atoms, a —CH$_2$CH$_2$N(R$^1$)SO— group (wherein R$^1$ is an alkyl group having 1 to 4 carbon atoms), a —CH$_2$CH(OZ$^1$)CH$_2$— group (wherein Z$^1$ is a hydrogen atom or an acetyl group), a —(CH$_2$)$_m$—SO$_2$—(CH$_2$)$_n$— group, or a (CH$_2$)$_m$-S—(CH$_2$)$_n$- group (wherein m is from 1 to 10 and n is from 0 to 10); and Rf is a linear or branched polyfluoroalkyl group having 1 to 6 carbon atoms;

wherein the fluorine-containing polymer does not contain the blocked isocyanate compound, wherein a functional organopolysiloxane bonds to the fluorine-containing polymer through a functional organic group, wherein the functional organopolysiloxane is a functional organopolysiloxane comprising siloxy units having the average formula:

(R$_2$SiO)$_a$(RR$^N$SiO)$_b$(RR$^F$SiO)$_c$ wherein a is 0-4000, b is 0-1000, c is 1-1000, R is independently a monovalent organic group, R$^N$ is a monovalent amino-functional organic group, and R$^F$ is a monovalent mercapto-, vinyl-, (meth)acrylamide- or (meth)acrylate-functional organic group; and wherein the blocked isocyanate compound is a compound having a blocked isocyanate group and no polymerizible unsaturated group, wherein a blocking agent in the blocked isocyanate compound is a pyrazole or an active methylene-containing compound.

9. The water- and oil-repellent composition according to claim 8, wherein the fluorine-containing polymer is not bonded to the blocked isocyanate compound, and the water- and oil-repellent composition comprises a mixture of the fluorine-containing polymer and the blocked isocyanate compound.

10. The water- and oil-repellent composition according to claim 5, which further contains an aqueous medium.

11. The water- and oil-repellent composition according to claim 5, which is an aqueous dispersion.

12. A method of treating a substrate with the water- and oil-repellent composition according to claim 5.

13. A textile treated with the water- and oil-repellent composition according to claim 5.

14. The polymer according to claim 1, wherein the amount of the blocked isocyanate compound is from 0.5 to 50 parts by weight, based on 100 parts by weight of the monomer.

15. The polymer according to claim 1, wherein X is a chlorine atom.

16. The polymer according to claim 1, wherein the blocking agent is a pyrazole compound.

17. The polymer according to claim 1, wherein X is a chlorine atom and wherein the blocking agent is a pyrazole compound.

* * * * *

UNITED STATES PATENT AND TRADEMARK OFFICE
CERTIFICATE OF CORRECTION

PATENT NO. : 9,677,220 B2  
APPLICATION NO. : 13/510787  
DATED : June 13, 2017  
INVENTOR(S) : Norimasa Uesugi et al.

Page 1 of 1

It is certified that error appears in the above-identified patent and that said Letters Patent is hereby corrected as shown below:

In the Claims

Claim 5, Column 30, Line 41, after "or a", please delete "-$(CH_2)_m$-S-$(CH_2)_n$-" and replace with -- -$(CH_2)_m$-S-$(CH_2)_n$- --

Claim 8, Column 31, Line 24, after "atoms, a", please delete "-$CH_2CH_2N(R^1)SO$-" and replace with -- -$CH_2CH_2N(R^1)SO_2$- --

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*